United States Patent [19]

Hatanaka et al.

[11] Patent Number: 4,870,545
[45] Date of Patent: Sep. 26, 1989

[54] HEADLIGHT CONTROL APPARATUS FOR MOTORCYCLES

[75] Inventors: Kaoru Hatanaka; Hajime Tabata, both of Saitama; Tooru Hasegawa, Tokyo; Yoshihiro Nakazawa, Saitama, all of Japan

[73] Assignee: Honda Giken Kogyo Kabushiki Kaisha, Tokyo, Japan

[21] Appl. No.: 257,216

[22] Filed: Oct. 13, 1988

[30] Foreign Application Priority Data

Oct. 13, 1987 [JP] Japan .................................. 62-258548

[51] Int. Cl.$^4$ ............................................. B62J 6/00
[52] U.S. Cl. ........................................ 362/72; 362/66; 315/82
[58] Field of Search ....................... 362/37, 71, 72, 66, 362/418, 428, 271, 272, 286; 315/79, 81, 82

[56] References Cited

U.S. PATENT DOCUMENTS 3,939,339  2/1976  Alphen .................................. 362/72
4,024,388  5/1977  Skoff ..................................... 362/72

Primary Examiner—Stephen F. Husar
Attorney, Agent, or Firm—Lyon & Lyon

[57] ABSTRACT

Method and apparatus are described for controlling the roadway illuminating position of a motorcycle headlight during cornering of the motorcycle by determining a basic desired optical axis deflection angle for the headlight in response to the turning radius of the vehicle and, coincident therewith, correcting the deflection angle in accordance with the determined longitudinal position of the motorcycle along the roadway turning line.

10 Claims, 4 Drawing Sheets

HEADLIGHT CONTROL APPARATUS FOR MOTORCYCLES

BACKGROUND OF THE INVENTION

The present invention relates to a headlight apparatus for motorcycles and, more particularly, to a headlight apparatus that deflects the optical axis of the headlight in accordance with the turning radius of a vehicle when the vehicle rounds a curve or turns a corner, or the like.

A conventional headlight deflection control apparatus for motorcycles is known in the prior art as disclosed in, for example, Laid-Open Japanese Patent No. Sho. 62-96148. This prior art, the disclosure of which is incorporated herein by reference, is designed to compute a turning radius from the vehicle speed and an inclination angle of the vehicle body, to compute an adjusted angle of optical axis of the headlight from the turning radius, and to turn the headlight by this adjusted angle of optical axis to the direction to which the vehicle body is going to turn, thereby improving light distribution to the turning path of the vehicle.

Generally, when rounding a corner, a motorcycle rider has a tendency to view the apex of the corner when he has come to the entrance of the corner, the exit of the corner when at a midway location therein, and the traffic condition ahead as in the forward straightaway when at the exit of the corner. However, the prior art described above has the problem that the headlight is only rotated by the aforesaid angle of the optical axis to the direction of turn of the vehicle body and, accordingly, light distribution to the areas within the rider's view at the entrance, midway and exit of the corner cannot be obtained.

The present invention, accordingly, has as a general objective to solve the above-mentioned problems of the prior art. It further seeks to provide a headlight control apparatus for motorcycles which has good light distribution characteristics in the direction of turning when the vehicle rounds a corner, and enables light distribution to the region of the rider's visual confirmation at each of the entrance, midway and exit positions of the corner.

SUMMARY OF THE INVENTION

According to the present invention there is provided a headlight optical axis deflection control apparatus for motorcycles comprising a vehicle speed sensing means; a handlebar turning angle sensing means; means for computing a turning radius for the vehicle from the vehicle speed and the handlebar turning angle sensed by said aforementioned sensing means, and computing from said turning radius a basic optical axis deflection angle at which the headlight illuminates a turning line; an optical axis control means for deflecting the optical axis of said headlight on the basis of said basic optical axis deflection angle; a corner position sensing means for sensing, from the running state of the vehicle, in which position of entrance, midway and exit the vehicle is present; and a correcting means for correcting said basic optical axis deflection angle to a greater value when the entrance position of a corner has been sensed by said corner position sensing means, and for correcting said basic optical axis deflection angle to a smaller value when the exit position of the corner has been sensed.

In the aforementioned headlight apparatus for motorcycles, the computing means computes the turning radius from the vehicle speed and the handlebar turning angle and also computes a basic headlight optical axis deflection angle from the turning radius. When the entrance position of the corner has been sensed by the corner position sensing means, the basic optical axis deflection angle is corrected to a greater value by a correcting means; and when the exit position of corner has been sensed, the basic optical axis deflection angle is corrected to a smaller value.

For a better understanding of the invention, its operating advantages and the specific objectives obtained by its use, reference should be made to the accompanying drawings and description which relate to a preferred embodiment thereof.

DESCRIPTION OF A PREFERRED EMBODIMENT

Figure 1:
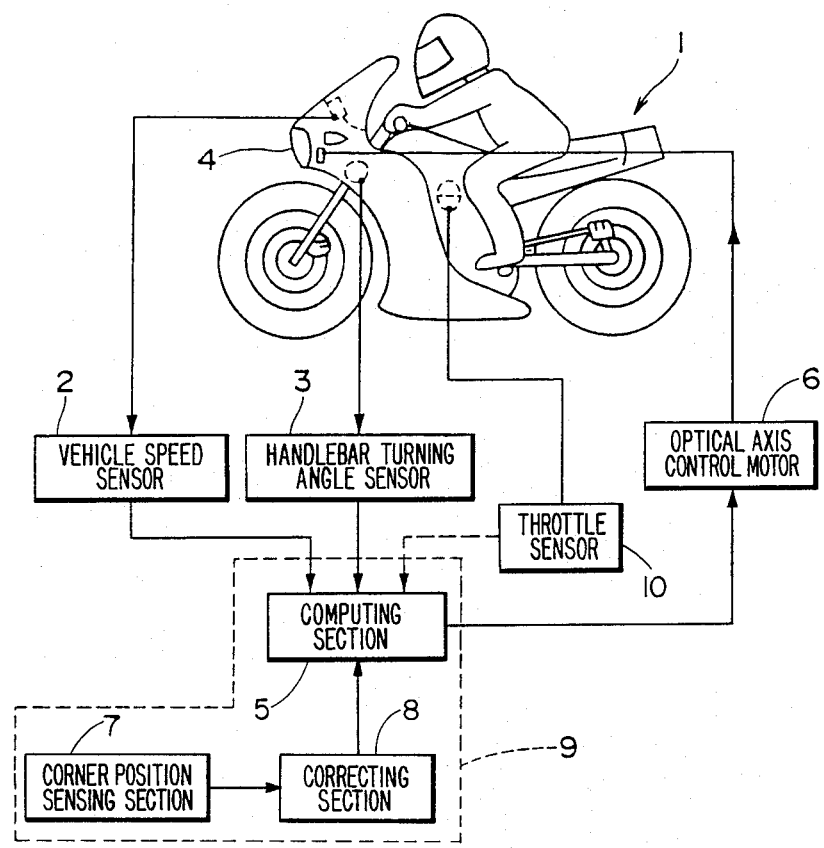
FIG. 1 is a block diagram illustrating schematically a motorcycle headlight control apparatus according to the present invention.

FIG. 1 is a schematic block diagram illustrative of a headlight apparatus for motorcycles pertaining to one embodiment of the present invention. As shown in this drawing figure, the headlight apparatus of a motorcycle 1 is provided with a vehicle speed sensor (the vehicle speed sensing means) 2 for sensing the vehicle speed $V_{sp}$; a steering wheel turning angle sensor (the handlebar turning angle sensing means) 3 for sensing the handlebar turning angle $\Theta ag$; a computing section (the computing means) 5 for computing the turning radius R of the vehicle from the vehicle speed $V_{SP}$ and the handlebar turning angle $\Theta ag$ that have been sensed by the sensors 2 and 3, and also computes from the turning radius R a basic optical axis deflection angle $\Delta\Theta o$ at which the headlight 4 illuminates the turning line; an optical axis control motor (the optical axis control means) 6 for deflecting the optical axis 4a of the headlight (see FIG. 2) on the basis of the basic optical axis deflection angle $\Delta\Theta o$; a corner position sensing section (the corner position sensing means) 7 for sensing from the running state of the vehicle in which region of the corner, i.e., entrance, midway or exit, the vehicle is present; and a correcting section (the correction means) 8 for correcting the basic optical axis deflection angle $\Delta\Theta o$ to a greater value when the entrance position of the corner has been sensed by the corner position sensing section 7, and also for correcting the basic optical axis deflection angle $\Delta\Theta o$ to a smaller value when the exit position of the corner has been sensed. The computing section 5, the corner position sensing section 7, and the correcting section 8 constitute the control unit 9. To the input terminal of the computing section 5, output signals from the vehicle speed sensor 2 and the handlebar turning angle sensor 3 as well as an output signal from the throttle sensor 10 are transmitted.

The operation of the above-described first embodiment of the present invention is explained with reference to FIG. 2 to FIG. 4. As shown in FIG. 4, fixed time interruption is effected (Step 401); the handlebar turning angle sensor 3 senses the handlebar turning angle, $\Theta ag$ (Step 402); the vehicle speed sensor 2 senses the vehicle speed, $V_{SP}$ (Step 403); the computing section 5 computes the turning radius R (R $= K \cdot V_{SP}/\Theta ag$) of the vehicle from the vehicle speed $V_{SP}$, and the handlebar turning angle, ag (Step 404); and computes, from the turning radius R, the basic optical deflection angle, $\Delta\Theta o$, at which the headlight illuminates the turning line 11 (See FIG. 3) (Step 405); and this optical axis deflection angle $\Delta\Theta o$ is outputted (Step 406).

Thereafter, a gear position sensor, which is not illustrated, senses the gear position (Step 407), and a throttle sensor 10 senses the accelerator opening, $\Theta_{TH}$ (Step 408). The vehicle speed computing section (not illustrated), which is a part of the aforementioned corner position sensing section 7, computes the vehicle speed, $V_{SP'}$, from the gear position and the accelerator opening, $\Theta_{TH}$(Step 409). The corner position sensing section 7 determines whether or not the vehicle speed, $V_{SP'}$, is greater than the accelerator opening $\Theta_{TH}$, at Step 410 and whether or not the vehicle speed, $V_{SP'}$, is smaller than the accelerator opening, $\Theta_{TH}$, at Step 411. Comparison between the vehicle speed, $V_{SP'}$, and the accelerator opening $\Theta_{TH}$, is made at a voltage value corresponding to each value, for example.

Figure 2:
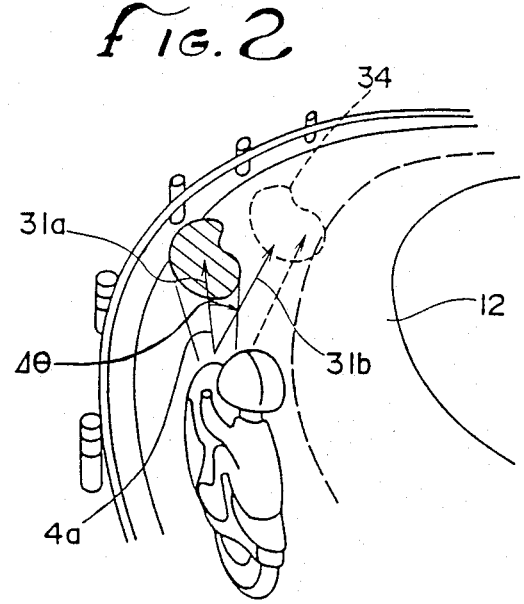
FIG. 2 is an explanatory view illustrating the running state of a vehicle in the vicinity of the entrance position of a corner.
Figure 3:
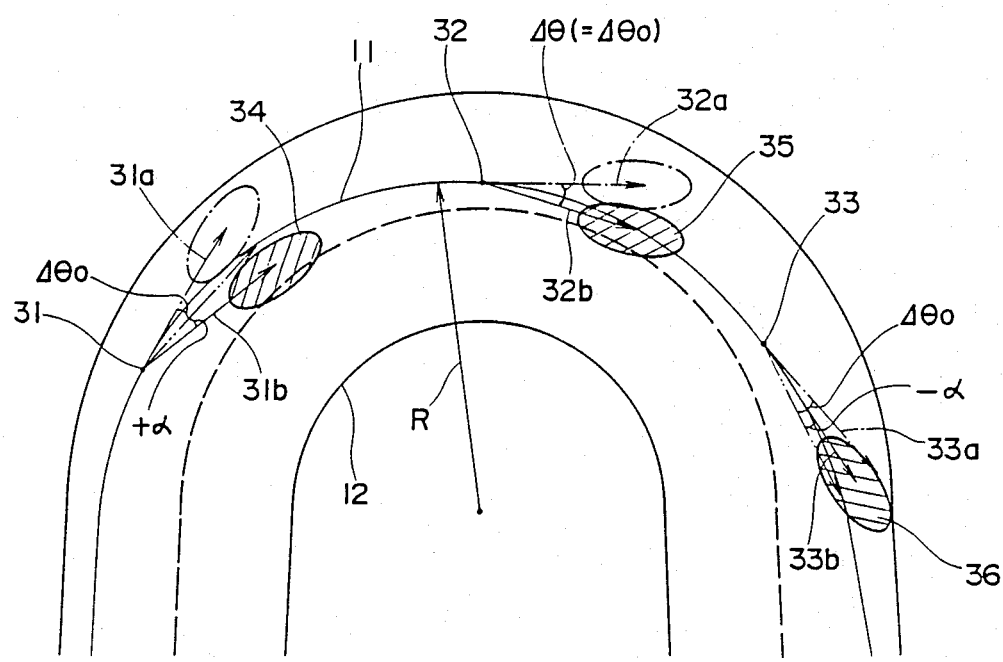
FIG. 3 is an explanatory view illustrating the direction of headlight deflection during riding at positions near the entrance, midway and exit of the corner, respectively.
Figure 4:
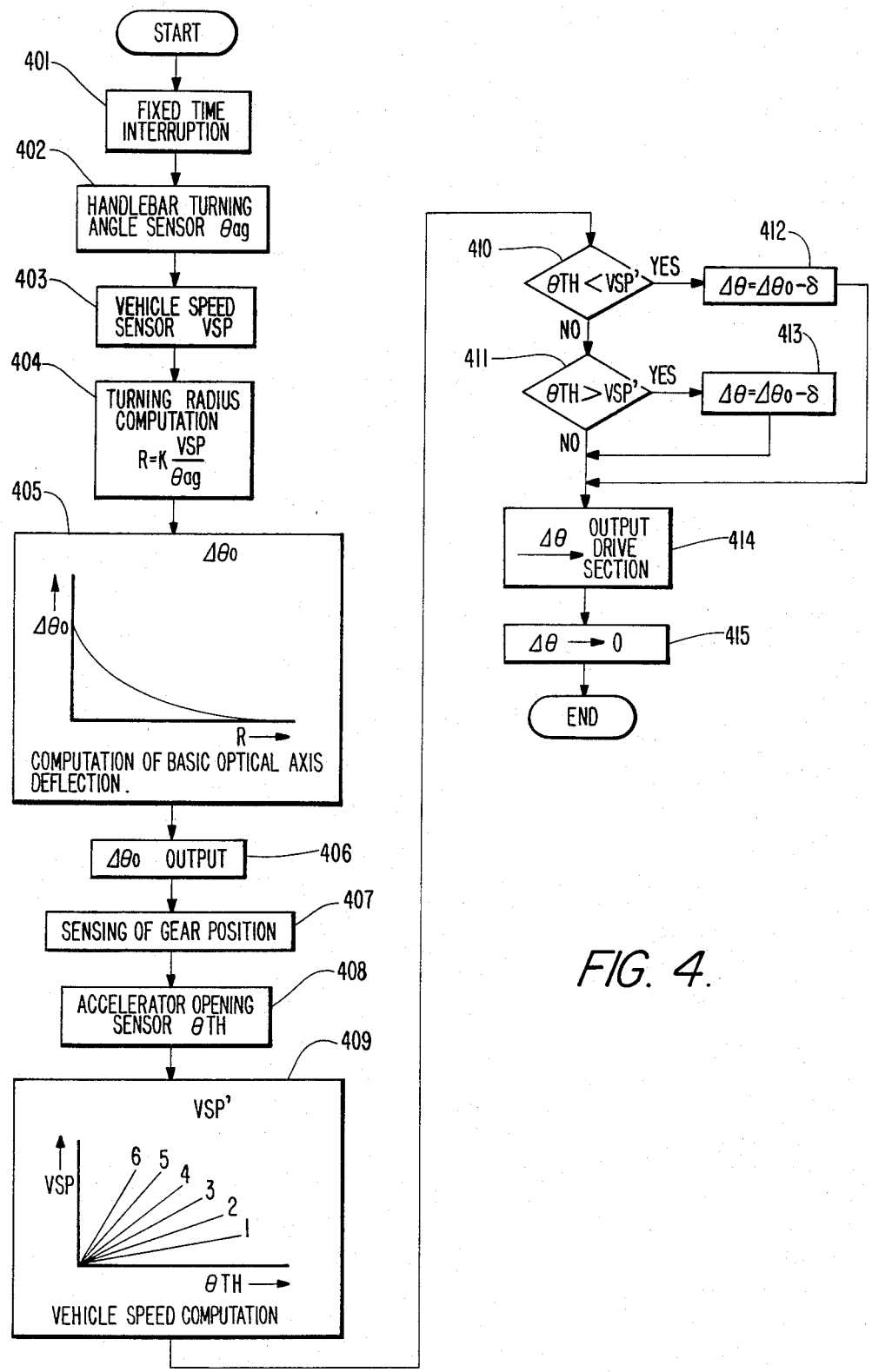
FIG. 4 is a flowchart illustrating the steps of operation of the headlight control apparatus of the present invention.

When an answer is "Yes" at Step 410, that is, when the engine brake is on, the corner position sensing section 7 outputs to the correcting section 8 a signal which denotes that the vehicle is near the entrance position 31 of the corner 12 as shown in FIGS. 2 and 3, which, in turn, outputs to the computing section 5 (Step 412) a corrected value $(+\alpha)$ for correcting the aforesaid basic optical axis deflection angle $\Delta\Theta o$ to a greater value. Consequently, the computing section 5 outputs the optical axis deflection angle, $\Delta\Theta(\Delta\Theta=\Delta\Theta o +\alpha)$, to the optical axis control motor 6 (Step 414). At this time, the optical axis 4a of the headlight 4, as shown in FIGS. 2 and 3, turns inwardly in the direction of turn through the above-mentioned optical axis deflection angle $\Delta\Theta(\Delta\Theta=\Delta\Theta o +\alpha)$, from the tangential direction 31a to the direction 31b of the turning line 11 at the above-mentioned entrance position 31. Therefore, the headlight 4 illuminates the rider's range of visibility near the entrance position 31, that is, the range of visibility near the apex of the corner 12.

When the answer at Step 410 is "No", proceed to the aforementioned Step 411, and when the answer at Step 411 is "No", that is, when the engine brake is off and the vehicle is not accelerated, the corner position sensing section 7 outputs to the correction section 8 a signal which indicates that, as shown at 32 in FIG. 3, the vehicle is near the midway position of the corner 12. At this time, the correction section 8 outputs a corrected value 0 to the computing section 5. Consequently, the computing section 5 outputs the optical axis deflection angle, $\Delta\Theta(\Delta\Theta=\Delta\Theta o)$, to the optical axis control motor 6 (Step 414). At this time, the optical axis 4a of the headlight 4, as shown in FIG. 3, turns inwardly in the direction of turn through the aforementioned optical axis deflection angle, $\Delta\Theta(\Delta\Theta=\Delta\Theta o)$ from the tangential direction 32a to the direction 32b of the turning line 11 at the aforesaid midway position 32 Therefore, the rider's view in the vicinity of the midway position 32, that is, a view 35 in the vicinity of the exit of the corner 12, are illuminated by the headlight 4.

When the answer at Step 411 is "Yes", that is, when the vehicle is under acceleration, the corner position sensing section 7 outputs to the correcting section 8 a signal which, as shown in FIG. 3, denotes that the vehicle is near the exit position 33 of the corner 12. The correcting section 8, in turn, outputs to the computing section 5 a corrected value $(-\alpha)$ for correcting the aforementioned basic optical deflection angle $\Delta\Theta o$ to a smaller value (Step 413). In consequence, the computing section 5 outputs the optical axis deflection angle, $\Delta\Theta(\Delta\Theta=\Delta\Theta o -\alpha)$, to the optical axis control motor 6 (Step 414). At this time the optical axis 4a of the headlight 4, as shown in FIG. 3, turns through the aforementioned optical axis deflection angle $\Delta\Theta(\Delta\Theta=\Delta\Theta o -\alpha)$ from the tangential direction 33a of the turning line 11 at the above-mentioned exit position 33, inwardly in the direction of turn, to the direction 33b so that the rider's view 36 in the vicinity of the entrance position 33 is illuminated by the headlight 4. At the conclusion of the procedure the aforementioned optical axis deflection angle $\Delta\Theta$ is reset at Step 415.

A headlight control apparatus for motorcycles according to a second embodiment of the present invention is described with reference to FIG. 5. The second embodiment differs from the first embodiment described in the method by which sensing is effected by the aforementioned corner position sensing section 7 of the entrance, midway and exit positions of the corner, but is identical to the first embodiment in other respects.

Figure 5:
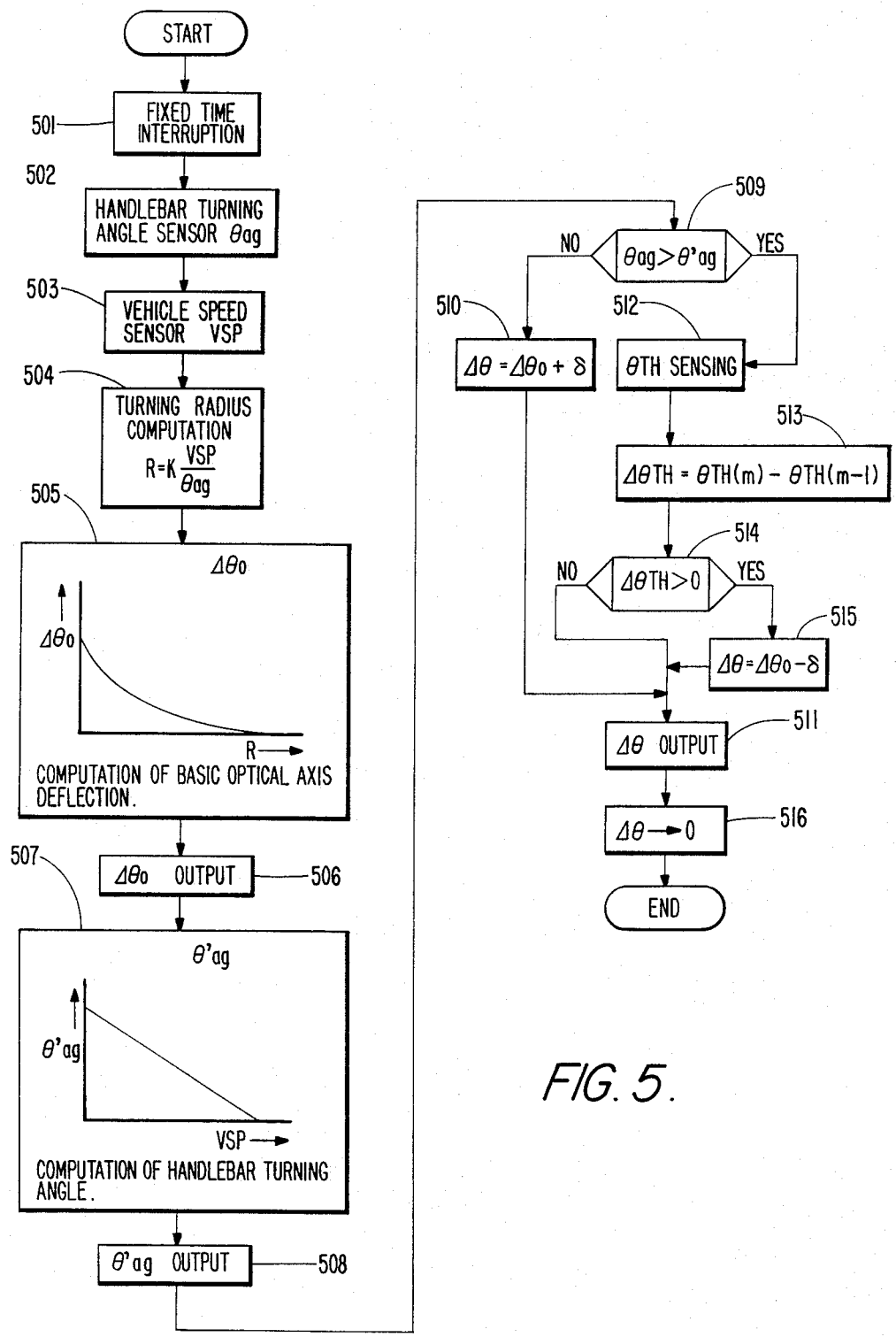
FIG. 5 is a flowchart illustrating the steps operation of a second embodiment of the present invention.

FIG. 5 is a flowchart explaining the steps of operation of the second embodiment. Steps 501 to 506 in this drawing are effected in a manner similar to that of Steps 401 to 406 in the FIG. 4 embodiment as described above. As shown in the flowchart, the handlebar turning angle set value computing section (not illustrated) which is a part of the aforesaid corner position sensing section 7 computes the handlebar turning angle set value, $\Theta ag'$, which is a function of the vehicle speed, $V_{SP'}$(Step 507), outputting the handlebar turning angle set value, $\Theta ag'$ (Step 508). This handlebar turning angle set value, $\Theta ag'$, is used to determine whether or not the vehicle, after passing the entrance position of the corner, has entered a midway position, that is whether or not the vehicle is turning a corner.

At Step 509, is determined whether or not the handlebar turning angle, $\Theta ag$, is greater than the handlebar turning angle set value $\Theta ag'$. When the answer is negative (No), the corner position sensing section 7 outputs to the correcting section 8 a signal which denotes that the vehicle is present in the vicinity of the entrance position 31 and the correcting section 8 will, in turn, output to the computing section 5 a corrected value $(+\alpha)$ to correct the aforementioned basic optical axis deflection angle $\Delta\Theta o$ to a greater value (Step 510). As a result, therefore, the computing section 5 outputs the optical axis deflection angle, $\Delta\Theta(\Delta\Theta=\Delta\Theta o +\alpha)$, to the optical axis control motor 6 similarly to the case of the aforesaid first embodiment (Step 511).

When the answer at Step 509 is affirmative (Yes), that is, when the vehicle is rounding a corner, the above-described throttle sensor 10 senses the accelerator opening, $\Theta_{TH}$(Step 512), and, effecting a fixed time interruption, senses a variation, $\Delta\Theta_{TH}$, $(\Delta\Theta_{TH} =\Theta_{TH} (m) -\Theta_{TH}(m-1))$, of the accelerator opening $\Theta_{TH}$ which is the difference between the accelerator opening, $\Theta_{TH}$ (m −1), previously sensed by the fixed time interruption and the accelerator opening, $\Theta_{TH}$ (m), sensed this time (Step 513), thus determining whether or the not the variation, $\Delta\Theta_{TH}$, of the accelerator opening, $\Theta_{TH}$ (Step 514) is increasing.

When the answer at Step 514 is negative (No), that is, when the vehicle is rounding a corner, but not under acceleration, the corner position sensing section 7 outputs to the correcting section 8 a signal denoting that the vehicle is near the midway position 32 of the corner 12, and the correcting section 8 outputs the corrected value 0 to the computing section 5. As a result, the computing section 5 outputs the optical axis deflection angle $\Delta\Theta(\Delta\Theta=\Delta\Theta o)$ to the optical axis control motor 6 similarly to the first embodiment described above (Step 511).

When the answer at Step 514 is affirmative (Yes), that is, when the vehicle is under acceleration during rounding a corner, the corner position sensing section 7 outputs to the correcting section 8 a signal which denotes the presence of the vehicle in the vicinity of the exit position 33 of the corner 12, which, in turn, outputs to the computing section 5 a corrected value $(-\alpha)$ for correcting the aforementioned optical axis deflection angle $\Delta\Theta o$ to a smaller value (Step 515). Consequently, the computing section 5 will output the optical axis deflection angle, $\Delta\Theta(\Delta\Theta=\Delta\Theta o -\alpha)$, to the optical axis control motor 6 similarly to the first embodiment (Step 514). And the aforementioned optical axis deflection angle $\Delta\Theta$ is reset at Step 516.

As described in detail above, according to the motorcycle headlight control apparatus of the present invention, the computing means computes the turning radius from the vehicle speed and the handlebar turning angle, and also computes from the turning radius the basic optical axis deflection angle for the projection of headlight beam onto the turning line. This arrangement, therefore, improves the light distribution characteristics in the direction of turn during cornering. The handlebar turning angle sensing means senses, from the running state of the vehicle, in which position of the corner, entrance, midway or exit, the vehicle is present. The correcting means accordingly corrects the basic optical axis deflection angle to a greater value when the entrance position of the corner has been sensed by the corner position sensing means, and, alternatively, corrects the basic optical axis deflection angle to a smaller value when the exit position of the corner has been sensed, thereby enhancing light distribution to the area the rider views at each position of entrance, midway and exit of the corner.

It should be further understood that, although the preferred embodiments of the invention have been illustrated and described herein, changes and modifications can be made in the described arrangements without departing from the scope of the appended claims.

We claim:

1. A motorcycle headlight optical axis deflection control apparatus comprising:
   means for determining the turning radius of said motorcycle;
   means for computing from said turning radius a basic optical axis deflection angle at which said headlight illuminates a roadway turning line;
   control means operatively connected to said motorcycle headlight for deflecting the optical axis of said headlight in accordance with the computed basic optical axis deflection angle;
   means for determining the longitudinal position of said motorcycle along said roadway turning line; and
   means for correcting the deflection of said headlight optical axis in response to the position of said motorcycle along said roadway turning line.

2. The control apparatus according to claim 1 in which said turning radius determining means comprises:
   means for sensing vehicle speed;
   means for sensing the turning angle of the motorcycle; and
   means for computing the turning radius of said motorcycle in response to the sensed values of vehicle speed and motorcycle turning angle.

3. The control apparatus according to claim 2 in which said turning angle sensing means comprises means for sensing the angular position of a steering wheel of said motorcycle.

4. The control apparatus according to claim 3 in which the angular position of said steering wheel is controlled by motorcycle handlebars and said turning angle sensing means comprises means for sensing the position of said handlebars.

5. The control apparatus according to claim 1 in which said headlight optical axis deflection angle is corrected at least at the entrance, and at the exit of said turning line.

6. The control apparatus according to claim 5 in which said headlight optical axis deflection angle is corrected at a position intermediate the entrance and exit positions of said turning line.

7. The control apparatus according to claim 5 in which said basic optical deflection angle is increased when said entrance position is sensed and decreased when said exit position is sensed.

8. A method of controlling the optical axis deflection angle of a motorcycle headlight comprising the steps of:
   determining the turning radius of the motorcycle;
   computing a basic optical axis deflection angle at which said headlight illuminates a roadway turning line;
   determining the position of the motorcycle along said roadway turning line; and
   positioning the headlight of the motorcycle headlight in response to the computed basic optical axis deflection angle as
   corrected in response to the position of the motorcycle along said roadway turning line.

9. The method according to claim 8 including the steps of sensing the speed of said motorcycle and the turning angle thereof and computing the basic optical deflection angle in response to the sensed speed and turning angle of said motorcycle.

10. The method according to claim 9 including the steps of increasing the optical deflection angle of said headlight when said motorcycle is at the entrance of said roadway turning line and reducing said optical deflection angle when said motorcycle is at the exit thereof.

* * * * *